United States Patent
Clos et al.

(10) Patent No.: US 10,816,367 B2
(45) Date of Patent: Oct. 27, 2020

(54) CARGO RESTRAINT ASSURANCE SYSTEM

(71) Applicant: The Boeing Company, Chicago, IL (US)

(72) Inventors: William Robert Clos, Snohomish, WA (US); Darrin Michael Noe, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 207 days.

(21) Appl. No.: 15/936,540

(22) Filed: Mar. 27, 2018

(65) Prior Publication Data

US 2019/0301899 A1    Oct. 3, 2019

(51) Int. Cl.
| | | |
|---|---|---|
| *G01D 5/36* | (2006.01) | |
| *G01D 5/34* | (2006.01) | |
| *B64D 45/00* | (2006.01) | |
| *B64D 9/00* | (2006.01) | |

(52) U.S. Cl.
CPC ............. *G01D 5/342* (2013.01); *B64D 9/003* (2013.01); *B64D 45/0005* (2013.01)

(58) Field of Classification Search
CPC ..... G01D 5/342; B64D 9/003; B64D 45/0005
USPC ........................................................ 250/232
See application file for complete search history.

(56) References Cited

U.S. PATENT DOCUMENTS

| | | | | |
|---|---|---|---|---|
| 4,379,668 A | * | 4/1983 | Pelletier ................. | B64D 9/003 410/69 |
| 9,738,125 B1 | * | 8/2017 | Brickley ................. | H04W 4/70 |
| 2009/0099775 A1 | * | 4/2009 | Mott ..................... | A01B 69/008 701/300 |
| 2009/0173823 A1 | * | 7/2009 | Shetzer .................. | B64D 29/06 244/129.4 |
| 2012/0312926 A1 | * | 12/2012 | Holzner ................... | B64D 9/00 244/137.1 |
| 2013/0327883 A1 | * | 12/2013 | Kordel ..................... | B64C 3/56 244/49 |
| 2014/0202824 A1 | * | 7/2014 | Esser ..................... | B60R 11/00 193/37 |

\* cited by examiner

*Primary Examiner* — Georgia Y Epps
*Assistant Examiner* — Kevin Wyatt
(74) *Attorney, Agent, or Firm* — Coats & Bennett, PLLC

(57) ABSTRACT

The latch detection system and latch detection method disclosed herein determines an orientation of one or more latches used to secure cargo in a cargo hold, and thus improves latch security and cargo transportation safety. To that end, aspects presented herein provide an optical latch detection system that detects whether one or more latches are in the locked or unlocked orientation. More particularly, aspects presented herein rely on a reflective laser system to determine the orientation of one or more latches based on the amount of reflected light detected by the laser system. In so doing, the disclosed latch detection system provides a reliable and repeatable option for determining the orientation of latch(es) in a cargo hold.

20 Claims, 8 Drawing Sheets

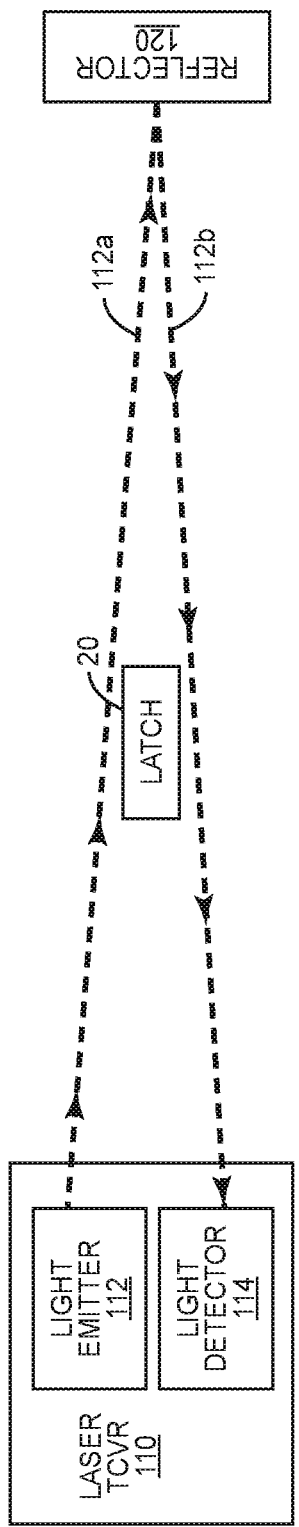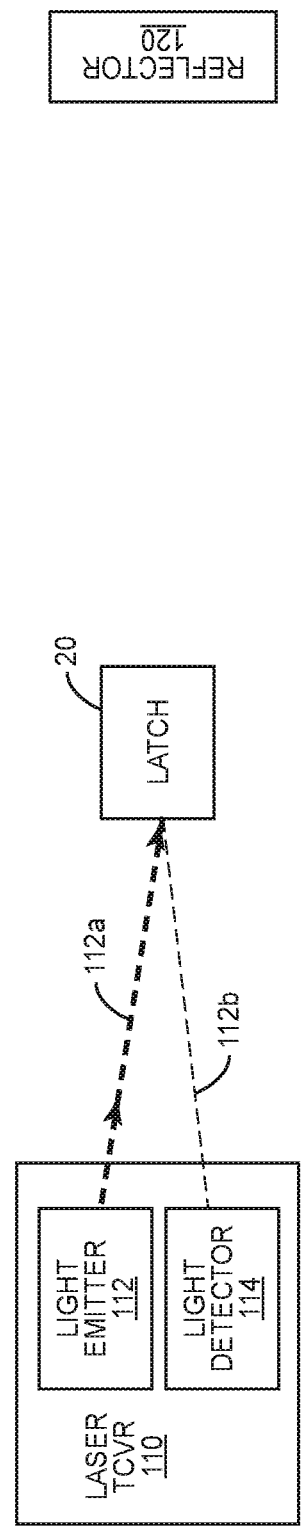

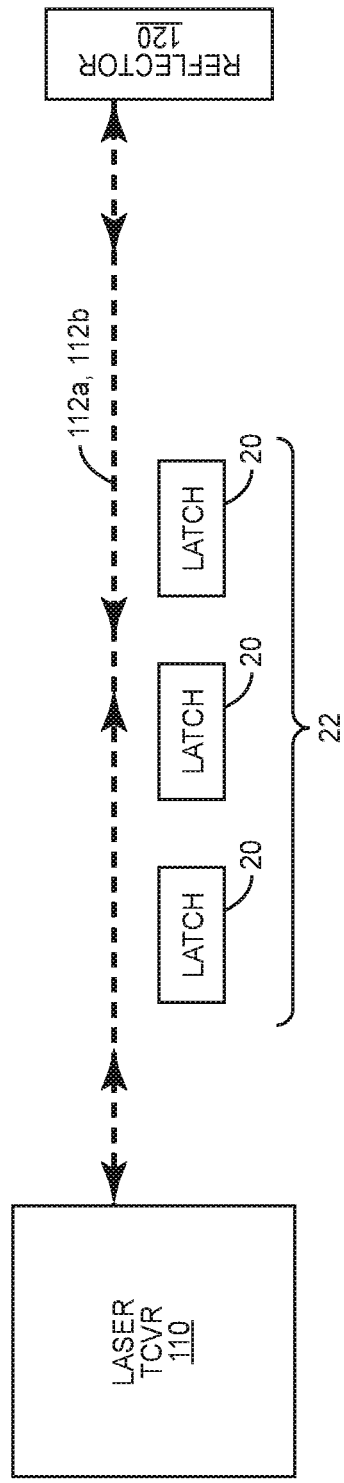
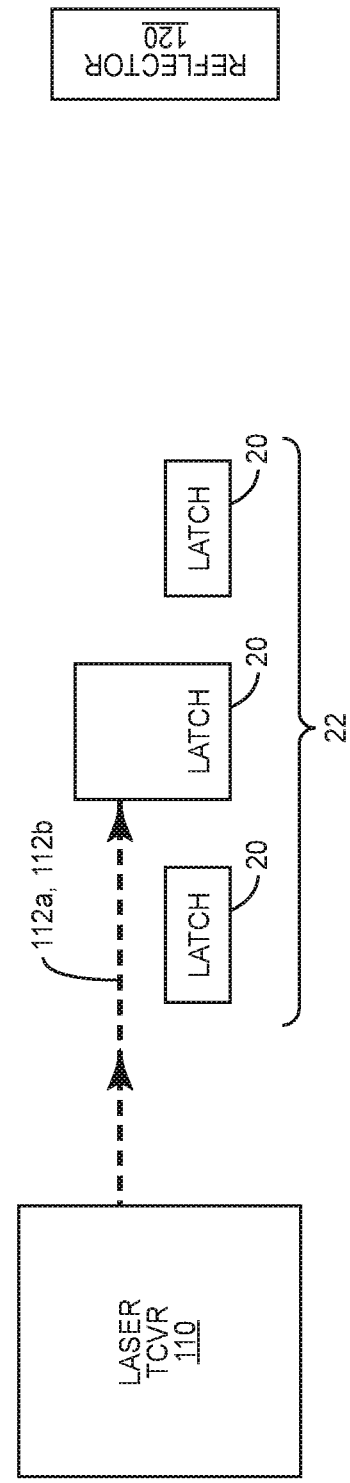
FIG. 5A
FIG. 5B

CARGO RESTRAINT ASSURANCE SYSTEM

BACKGROUND

Cargo is transported all over the world via any number of transportation vehicles. As used herein, a "vehicle" is anything that transports people or things, including, but not limited to aircrafts (e.g., airplanes, helicopters, etc.), trains, trucks, boats, etc., where each vehicle includes a cargo hold for storing cargo. To protect the cargo and to prevent potentially dangerous weight shifts during transportation, particularly in large cargo holds, cargo may be secured or otherwise restrained within a cargo hold. For example, cargo in an aircraft cargo hold that moves during takeoff, flight, or landing may damage the aircraft, damage the cargo, and/or cause flight disruptions or anomalies. Similar issues may arise with cargo being transported in other vehicles. Thus, an effective cargo restraint system within a cargo hold is important for transporting cargo from a source to a destination.

Some cargo holds use latches to secure the cargo. After the cargo is placed in the cargo hold, such latches are locked to secure the cargo in place. If the latches are not fully positioned in the locked orientation, however, vibrations during transport and/or contact between the latches and cargo in the cargo hold may cause the latches to unlock, either before transport begins, or sometime during transport. Such a cargo restraint failure may allow the cargo to shift around within the cargo hold.

Current systems generally rely on a cargo handler to ensure that all latches are properly locked. Human error, however, may result in improperly locked latches, which may ultimately fail during transport. Other proposed solutions have used micro-switches to detect the orientation of the latches. However, such solutions typically have not provided suitable reliability and are susceptible to corrosion.

As such, there is a need for new and improved ways to ensure that latches relied upon to secure cargo within a cargo hold are in the fully locked position before further cargo is loaded and/or before transport begins.

SUMMARY

The present disclosure relates to methods, apparatuses, systems, computer program products, software, and/or mediums for improved latch security and safety. To that end, aspects presented herein provide an optical latch detection system that detects whether one or more latches are in a locked or unlocked orientation. More particularly, aspects presented herein rely on a reflective laser system to determine the orientation of one or more latches based on an amount of reflected light detected by the laser system. In so doing, the disclosed latch detection system provides a reliable and repeatable option for determining the orientation of latch(es) in a cargo hold.

The present disclosure discloses a latch detection system configured to determine an orientation of one or more latches configured to secure cargo within a cargo area when in a locked orientation. The latch detection system comprises a laser transceiver, a reflector, and a processor circuit. The laser transceiver is disposed on a first side of a first latch. The laser transceiver comprises a light emitter and a light detector. The reflector is disposed on a second side of the first latch opposite the first side and is aligned with the laser transceiver along an axis. The processor circuit is configured to determine an orientation of the first latch by determining the first latch is in a first orientation when a laser beam emitted by the light emitter reflects off the reflector such that the light detector detects at least a threshold amount of light, and determining the first latch is in a second orientation different from the first orientation when the light detector detects less than the threshold amount of light.

According to a further aspect, the first orientation comprises an unlocked orientation, and the second orientation comprises the locked orientation.

According to a further aspect, the first orientation comprises the locked orientation, and the second orientation comprises an unlocked orientation.

According to a further aspect, one or more additional latches disposed between the laser transceiver and the reflector align with the first latch to form a set of latches comprising the first latch and the one or more additional latches. For this further aspect, the processor circuit is configured to determine the orientation of at least one of the latches in the set of latches by determining that each of the latches in the set of latches is in the locked orientation when the laser beam emitted by the light emitter reflects off the reflector such that the light detector detects at least the threshold amount of light, and determining that at least one of the latches in the set of latches is in the unlocked orientation when the light detector detects less than the threshold amount of light.

According to a further aspect, one or more additional latches disposed between the laser transceiver and the reflector align with the first latch to form a set of latches comprising the first latch and the one or more additional latches, where each latch in the set of latches is disposed in a corresponding rail of a set of rails, where each rail comprises a first opening and a second opening on opposing sides and proximate the corresponding latch, and where the first and second openings in each rail align with the axis aligning the laser transceiver and the reflector. For this aspect, the processor circuit is configured to determine the orientation of at least one of the latches in the set of latches by determining that each latch in the set of latches is in the locked orientation when the laser beam emitted by the light emitter passes through the first and second openings of each rail in the set of rails, reflects off the reflector, and passes back through each of the second and first openings such that the light detector detects at least the threshold amount of light, and determining that at least one of the latches in the set of latches is in the unlocked orientation when the light detector detects less than the threshold amount of light.

According to a further aspect, the first latch is disposed in a first rail comprising first and second openings on opposing sides of the first rail and proximate the first latch, and the first and second openings in the first rail align with the axis aligning the laser transceiver and the reflector. For this aspect, the processor circuit determines the orientation of the first latch by determining that the first latch is in the first orientation when the laser beam emitted by the light emitter passes through the first and second openings, reflects off the reflector, and passes back through the second and first openings such that the light detector detects at least the threshold amount of light, and determining that the first latch is in the second orientation when the light detector detects less than the threshold amount of light.

According to a further aspect, the cargo area is part of an aircraft.

According to a further aspect, the latch detection system further comprises an output device, where the processor circuit is further configured to output a signal to the output device responsive to the evaluation to inform an operator of the determined orientation of the first latch.

According to a further aspect, the output device comprises at least one of a speaker and a display configured to respectively provide at least one of audible and visible information regarding the determined orientation of the first latch. The output device may be located in any number of places associated with the cargo area, including but not limited to, on an aircraft (e.g., in the cockpit and/or in the cargo area) and/or remotely from an aircraft (e.g., in an air traffic control center, in a cargo loading control center, as part of a mobile device carried by cargo handling personnel, etc.).

According to a further aspect, at least one of the speaker and the display are configured to output at least one of an audible alarm and a visible alarm when the determined orientation comprises an unlocked orientation.

The present disclosure also discloses a method of determining an orientation of one or more latches configured to secure cargo within a cargo area when in a locked orientation. The method comprises aligning a laser transceiver along an axis with a reflector, where the laser transceiver comprises a light emitter and a light detector. The laser transceiver is disposed on a first side of a first latch and the reflector is disposed on a second side of the first latch opposite the first side. The method further comprises emitting a laser beam from the light emitter, and evaluating an amount of light detected by the light detector to determine the orientation of the first latch. The method determines the orientation by determining the first latch is in a first orientation when the laser beam emitted by the light emitter reflects off the reflector such that the light detector detects at least a threshold amount of light, and determining the first latch is in a second orientation different from the first orientation when the light detector detects less than the threshold amount of light.

According to a further aspect, the first orientation comprises an unlocked orientation, and the second orientation comprises the locked orientation.

According to a further aspect, the first orientation comprises the locked orientation, and the second orientation comprises an unlocked orientation.

According to a further aspect, one or more additional latches disposed between the laser transceiver and the reflector align with the first latch to form a set of latches comprising the first latch and the one or more additional latches. For this aspect, determining the orientation comprises determining the orientation of at least one of the latches in the set of latches by determining that each of the latches in the set of latches is in the locked orientation when the laser beam emitted by the light emitter reflects off the reflector such that the light detector detects at least the threshold amount of light, and determining that at least one of the latches in the set of latches is in the unlocked orientation when the light detector detects less than the threshold amount of light.

According to a further aspect, one or more additional latches disposed between the laser transceiver and the reflector align with the first latch to form a set of latches comprising the first latch and the one or more additional latches. Each latch in the set of latches is disposed in a corresponding rail of a set of rails, where each rail comprises a first and second opening on opposing sides of the rails and proximate the corresponding latch. The first and second openings in the rails align with the axis aligning the laser transceiver and the reflector. For this aspect, determining the orientation comprises determining the orientation of at least one of the latches in the set of latches by determining that each latch in the set of latches is in the locked orientation when the laser beam emitted by the light emitter passes through the first and second openings of each rail in the set of rails, reflects off the reflector, and passes back through each of the second and first openings such that the light detector detects at least the threshold amount of light, and determining that at least one of the latches in the set of latches is in the unlocked orientation when the light detector detects less than the threshold amount of light.

According to a further aspect, the first latch is disposed in a first rail comprising first and second openings on opposing sides of the first rail and proximate the first latch. The first and second openings in the first rail align with the axis aligning the laser transceiver and the reflector. For this aspect, determining the orientation comprises determining the orientation of the first latch by determining that the first latch is in the first orientation when the laser beam emitted by the light emitter passes through the first and second openings, reflects off the reflector, and passes back through the second and first openings such that the light detector detects at least the threshold amount of light, and determining that the first latch is in the second orientation when the light detector detects less than the threshold amount of light.

According to a further aspect, the method further comprises outputting a signal to an output device responsive to the evaluation to inform an operator of the determined orientation of the first latch.

According to a further aspect, outputting the signal comprises outputting at least one of an audible indication and a visible indication configured to respectively provide at least one of audible information and visible information regarding the determined orientation of the first latch.

According to a further aspect, outputting at least one of the audible indication and the visible indication comprises outputting at least one of an audible alarm and a visible alarm when the determined orientation comprises an unlocked orientation.

The present disclosure also discloses an aircraft. The aircraft comprises a cargo area, a first latch, a laser transceiver, a reflector, and a processor circuit. The first latch is disposed in the cargo area and configured to secure cargo within the cargo area when in a locked orientation. The laser transceiver is disposed on a first side of a first latch. The laser transceiver comprises a light emitter and a light detector. The reflector is disposed on a second side of the first latch opposite the first side and aligned with the laser transceiver along an axis. The processor circuit is configured to determine an orientation of the first latch by determining the first latch is in a first orientation when a laser beam emitted by the light emitter reflects off the reflector such that the light detector detects at least a threshold amount of light, and determining the first latch is in a second orientation different from the first orientation when the light detector detects less than the threshold amount of light.

BRIEF DESCRIPTION OF THE DRAWINGS

FIGS. 4A and 4B are diagrammatic representations of side views of a latch detection system in operation according to one exemplary aspect.

FIGS. 5A and 5B are diagrammatic representations of top views of a latch detection system in operation according to one exemplary aspect.

DETAILED DESCRIPTION

Aspects of the present disclosure are directed to methods, apparatuses, systems, computer program products, and/or software for determining the orientation of a latch used to secure cargo in a cargo hold. The aspects presented herein are described in terms of a cargo hold on an aircraft, e.g., an airplane, and the restraining of cargo within such an aircraft cargo hold. It will be appreciated, however, that the aspects presented herein are not limited to aircraft cargo holds, but rather apply to any cargo securing system that uses latches to secure cargo within a cargo hold.

Figure 1:
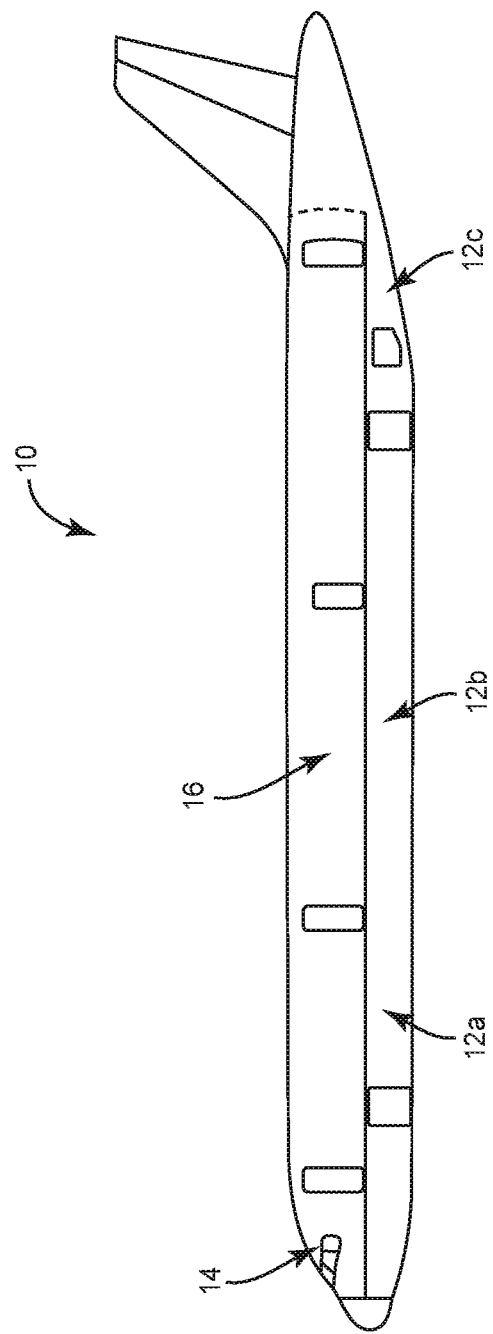
FIG. 1 shows a partial cutaway side view of an exemplary airplane.

FIG. 1 shows a partial cutaway side view of an airplane 10 to show exemplary interior compartments for the airplane 10, which include, but are not limited to, the forward cargo hold 12a, aft cargo hold 12b, rear cargo hold 12c, restroom (not shown), cockpit 14, passenger compartment 16, galley (not shown), etc. For simplicity, aspects described herein will generally refer to any cargo hold for any vehicle as "cargo hold 12." It will be appreciated that the latch detection system presented herein is installed in one or more of the cargo holds 12 to convey information regarding the orientation of one or more latches within the corresponding cargo hold 12. Exemplary aspects may optionally output a signal regarding the determined orientation to at least one output device to inform any personnel monitoring the functionality of the cargo hold of the status of the latch(es). Other exemplary aspects may not output such a signal, e.g., when the latch detection system determines that all latches are locked.

Figure 2:
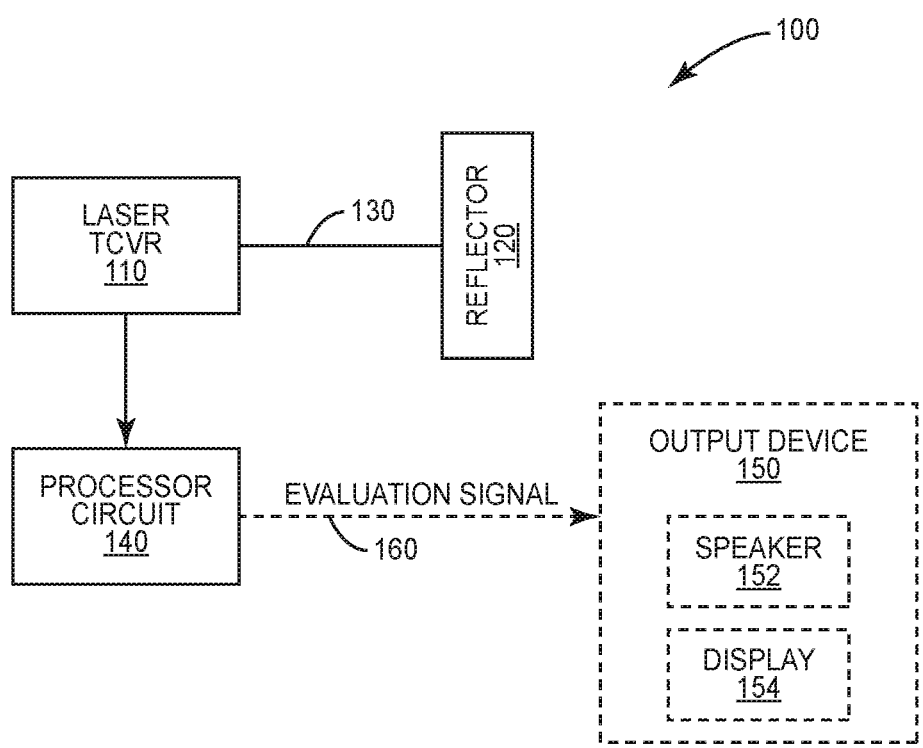
FIG. 2 shows a block diagram for a latch detection system according to one exemplary aspect.

FIG. 2 shows an aspect of a latch detection system 100, comprising a laser transceiver 110, a reflector 120, and a processor circuit 140, where the laser transceiver 110 comprises a light emitter 112 and a light detector 114 (FIGS. 4A and 4B). The light emitter 112 is configured to emit light at a wavelength within a range of wavelengths, and the light detector 114 is configured to detect light within the same range of wavelengths as the light emitter 112. In some aspects, the laser transceiver 110 may be configured for wavelengths outside the visible spectrum to prevent ambient light from interfering with the operation of the latch detection system 100.

Figure 3:
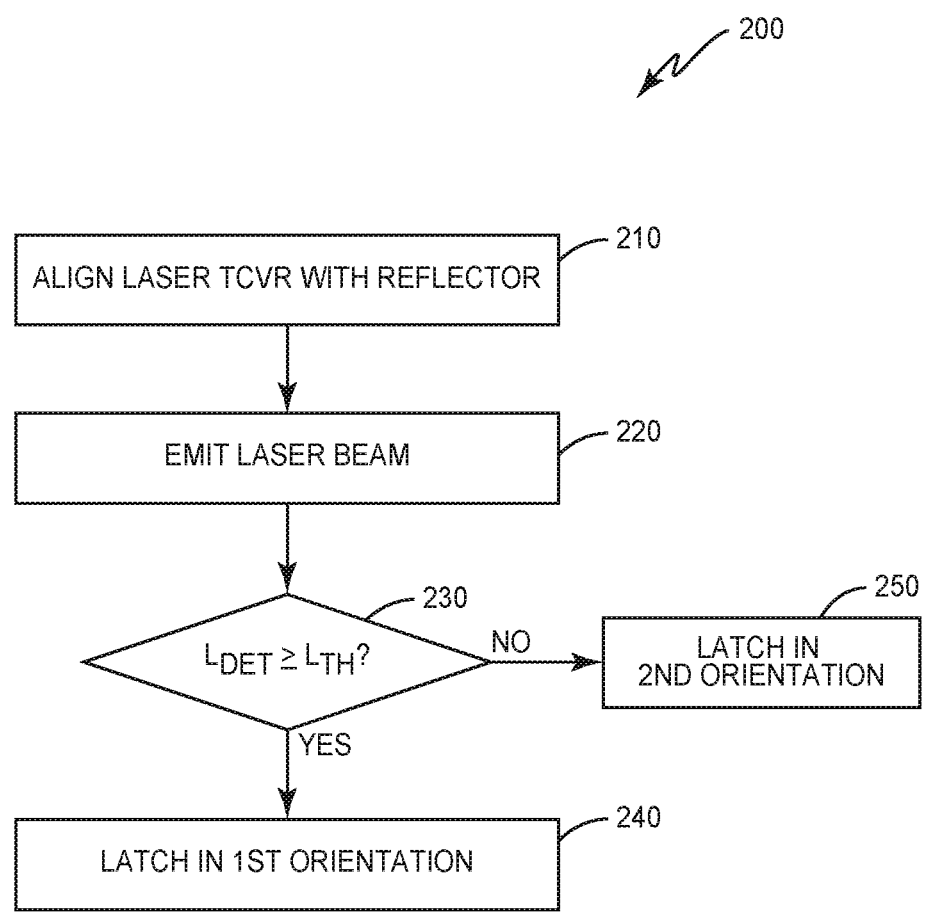
FIG. 3 is a diagrammatic representation of a latch detection method according to one exemplary aspect.

Aspects presented herein place the laser transceiver 110 and reflector 120 on opposing sides of a latch 20 (e.g., FIG. 4A), and determine the orientation of that latch 20 according to the method 200 of FIG. 3. More particularly, the laser transceiver 110 and reflector 120 are aligned along an axis 130 (block 210; see also FIGS. 6 and 7) such that any unobstructed laser beam emitted by the light emitter 112 (block 220) will reflect off the reflector 120 and be received by the light detector 114. To determine the orientation of the latch 20, the processor circuit 140 compares the amount of light detected by the light detector 114 $L_{det}$ with a threshold amount of light $L_{th}$ (block 230). When a laser beam emitted by the light emitter 112 reflects off the reflector 120 such that the light detector 114 detects at least a threshold amount of light $L_{th}$, the processor circuit 140 determines that the latch 20 is in a first orientation (block 240). When the light detector 114 detects less than the threshold amount of light $L_{th}$, processor circuit 140 determines that the latch 20 is in a second orientation different from the first orientation (block 250).

FIGS. 4A and 4B are diagrammatic representations of a side view of latch detection system 100 for determining the orientation of a single latch 20. As shown in FIG. 4A, when latch 20 is in the first orientation, the laser beam 112a emitted by the light emitter 112 passes by the latch 20 relatively unobstructed, reflects off the reflector 120 and returns to the laser transceiver 110 relatively unobstructed, such that the amount of light of the reflected laser beam 112b detected by the light detector 114 is not significantly reduced relative to the amount of light of the emitted laser beam 112a. However, when latch 20 is in a second orientation, different from the first orientation, the latch 20 at least partially obstructs the laser beam 112a emitted by the light emitter 112. Thus, even if light detector 114 detects some light reflected by the latch 20 and/or some light reflected by the reflector 120, the amount of light of any laser beam 112b detected by the light detector 114 is significantly reduced relative to the amount of light of the emitted laser beam 112a. As such, the processor circuit 140 may determine the orientation of the latch 20 from the amount of light of the laser beam detected by the light detector 114.

It will be appreciated that for aspects involving a single latch 20, the first orientation of FIG. 4A may be the locked orientation, while the second orientation of FIG. 4B may be the unlocked orientation. Alternatively, the first orientation of FIG. 4A may be the unlocked orientation, while the second orientation of FIG. 4B may be the locked orientation.

Aspects described herein also apply when multiple latches 20 are disposed between the laser transceiver 110 and the reflector 120. FIGS. 5A and 5B are diagrammatic representations of a top view of a latch detection system 100 for determining the orientation of a set 22 of latches 20. In this aspect, each latch 20 in the set 22 is aligned along a common axis parallel to axis 130 (see FIGS. 6 and 7. As shown in FIG. 5A, when each latch 20 in the set 22 is in the first orientation, the laser beam 112a emitted by the light emitter 112 passes by the latches 20 relatively unobstructed, reflects off the reflector 120 and returns to the laser transceiver 110 relatively unobstructed, such that the amount of light of the reflected laser beam 112b detected by the light detector 114 is not significantly reduced relative to the amount of light of the emitted laser beam 112a. However, when one or more of the latches 20 in the set 22 is/are in a second orientation, different from the first orientation, the emitted laser beam 112a and/or the reflected laser beam 112b is at least partially obstructed. Thus, even if light detector 114 detects some light reflected by the obstructing latch(es) 20 and/or some light reflected by the reflector 120, the amount of light of any reflected laser beam 112b detected by the light detector 114 is significantly reduced relative to the amount of light of the emitted laser beam 112a. As such, the processor circuit 140 (FIG. 2) may determine the orientation of the latch 20 from the amount of light of the detected laser beam. For this aspect, the latches 20 in the first orientation (FIG. 5A) are all in the locked orientation, while one or more of the latches 20 in the second orientation (FIG. 5B) is/are in the unlocked orientation. As such, when latch detection system 100 is used to determine the orientation of a set 22 of multiple latches 20, the latch detection system 100 is able to differentiate between all latches 20 being locked (FIG. 5A) verses when one or more of the latches 20 are not locked (FIG. 5B).

As shown in FIG. 2, the latch detection system 100 may output an evaluation signal 160 to an output device 150 communicatively coupled to the processor circuit 140. It will be appreciated that a single output device 150 may be communicatively coupled to one or more processor circuits 140, and thus may be associated with multiple latch detection systems 100. In some aspects, the output device 150 may be located on the airplane 10, e.g., in the cargo hold 12a, 12b, 12c, and/or in the cockpit 14. Alternatively or additionally, the output device 150 may be co-located with the corresponding processor circuit 140. Alternatively or additionally, the output device 150 may be remotely located from the airplane 10, e.g., in a control tower (not shown), in a cargo control center (not shown), and/or in a portable device that may sync to the corresponding processor circuit(s) 140. Exemplary portable devices include, but are not limited to handheld devices, laptops or other portable computers, etc., that communicate with the corresponding processor circuit (s) 140 via any known wired or wireless connections.

Output device 150 includes an audible and/or visual output circuit, e.g., a speaker 152 and/or a display 154. The corresponding processor circuit(s) 140 provide an evaluation signal 160 to the output device. Responsive to the evaluation signal 160, in some aspects the output device 150 activates the speaker 152 and/or the display 154 to provide latch orientation information to the operator monitoring the output device 150. For example, speaker 152 may project an alarm when one or more latches 20 are unlocked and/or may project an "all clear" or other audible indication that all latches 20 are locked. Alternatively or additionally, display 154 may provide a visual indication of the locked/unlocked status of one or more of the latches 20. For example, the display 154 may use colors to indicate the orientation, e.g., green for a locked latch 20 or set 22 of latches 20 and red for an unlocked latch 20 or for a set 22 of latches 20 comprising at least one unlocked latch 20. In another example, display 154 may use words or other symbols to indicate the orientation of the latch(es) 20, e.g., a circle or "L" for locked and an "X" or "U" for unlocked. It will be appreciated that these examples are illustrative, and thus that the aspects provided herein are not limited to specific types of information provided by output device 150.

In some aspects, a processor circuit 140 only sends the evaluation signal 160 to an output device 150 when one or more of the associated latches 20 are unlocked. In this case, the evaluation signal 160 serves as a warning signal that enables the output device 150 to output an alarm.

In some exemplary aspects, evaluation signal 160 comprises a locked/unlocked signal. For these aspects, the operator responsible for evaluating the provided output determines either that all latches 20 are locked (a locked evaluation signal 160) or that at least one latch 20 is unlocked (an unlocked evaluation signal 160). As such, the former case provides an "all clear," while the latter case serves as a prompt for the operator/cargo handler to inspect each latch 20 in a cargo hold 12 that may be associated with the unlocked evaluation signal 160.

In some aspects, the evaluation signal 160 may provide additional information regarding the latch(es) 20 associated with that evaluation signal 160. For example, the evaluation signal 160 may identify the latch 20, the set 22 of latches 20, and/or the area within the cargo hold 12 to which the evaluation signal 160 applies. Alternatively or additionally, the evaluation signal 160 may indicate the extent to which a latch 20 is unlocked. For example, when a latch 20 is close to the locked orientation, but isn't quite in the locked orientation, the amount of light of the reflected laser beam 112b detected by the light detector 114 will generally be less than a threshold $L_{th}$, but greater than the amount of light detected when the latch 20 is in a partially or fully unlocked orientation. Thus, processor circuit 140 may make a determination regarding the extent to which one or more of the latches 20 are in the unlocked orientation based on the detected amount of light, and provide that information to the output device 150 via the evaluation signal 160. Such information may, for example, be helpful to the cargo handler in finding the unlocked latch(es) 20. In some aspects, the evaluation signal 160 may further include a time and/or date stamp indicating when the orientation of the latches was last checked. In some aspects, the evaluation signal 160 may include other cargo-specific information already provided by existing drive system controllers and/or drive units, e.g., cargo position information, cargo weight information, etc.

Figure 6:
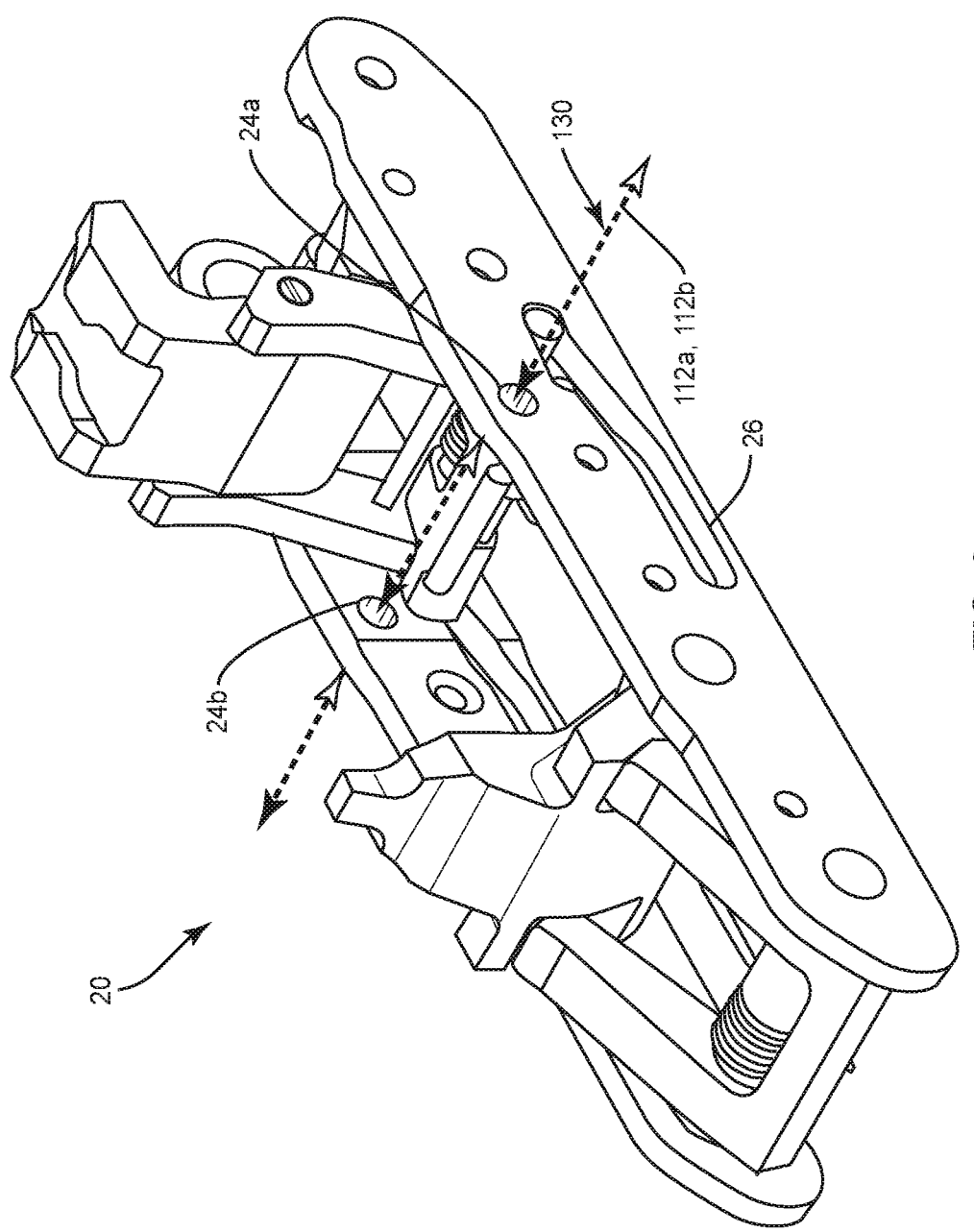
FIG. 6 shows a latch according to one exemplary aspect.

In some aspects, a cargo hold 12 includes one or more latches 20. FIG. 6 shows one example of a latch 20. Such latches 20 may be "free standing," e.g., secured to the floor of the cargo hold 12 such that a latch in the locked orientation (FIG. 6) prevents cargo from moving around in the cargo hold 12.

Figure 7:
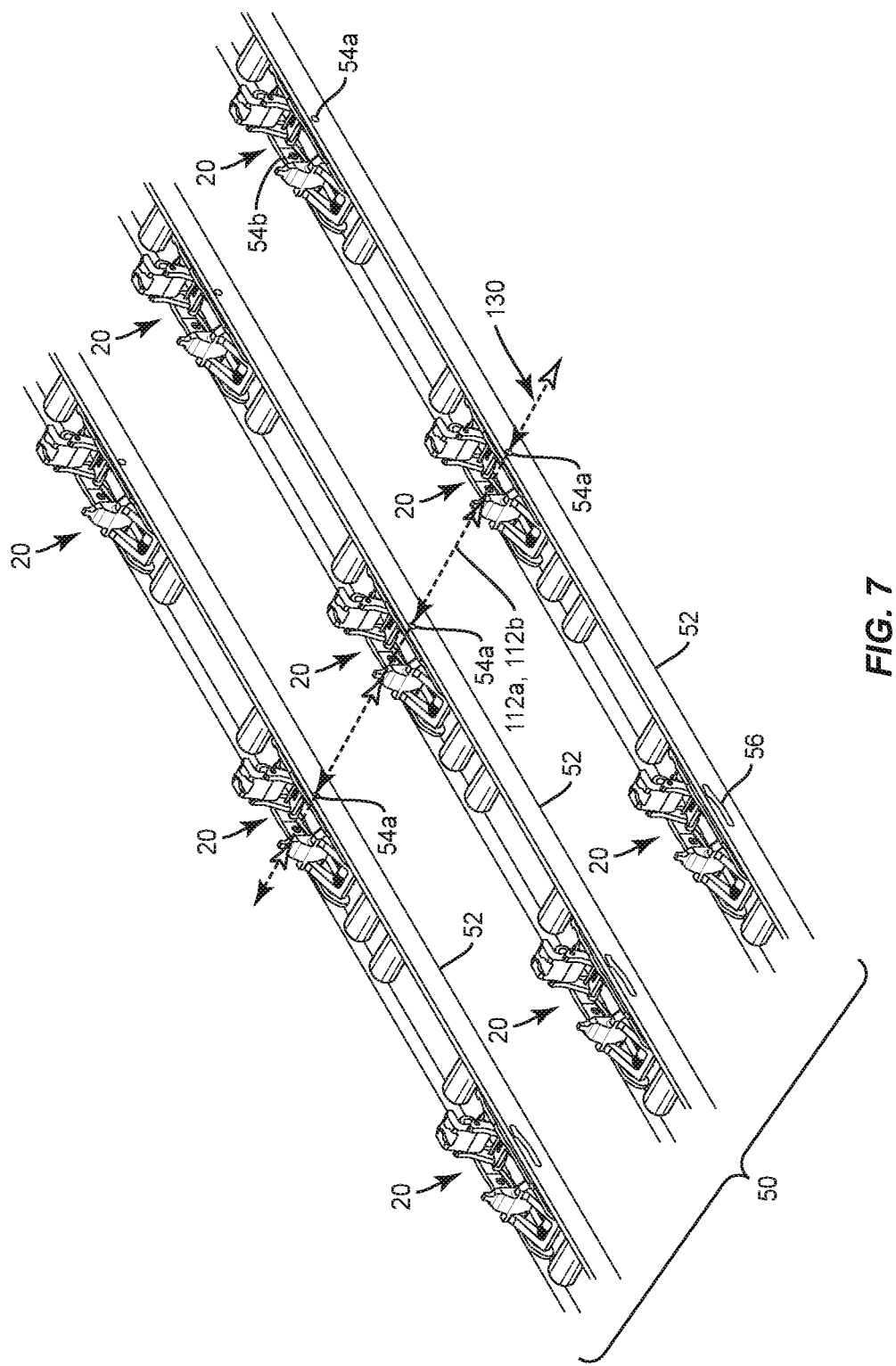
FIG. 7 shows a rail system comprising multiple rails, each rail comprising one or more latches, according to one exemplary aspect.

In other aspects, the latches 20 may be disposed in one or more rails 50, as shown in FIG. 7, which may, for example, facilitate the movement of the cargo within the cargo hold 12. In these aspects, each rail 52 in the set of rails 50 comprises at least one latch 20, where the latches 20 in adjacent rails 52 are aligned, as shown in FIG. 7. In this aspect, each rail 52 includes first and second openings 54a, 54b disposed on opposing sides of the rail 52, such that the openings 54a, 54b are also disposed proximate the corresponding latch 20 and on opposing sides of the latch 20 such that the latch 20 at least partially obstructs the openings 54a, 54b when in one of the first and second orientations (see FIG. 8B).

Figure 8A:
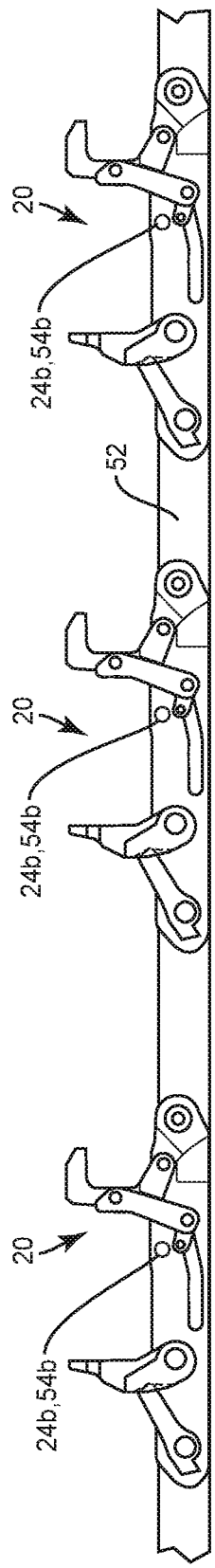
FIG. 8A shows a side view of a rail with the latches in the locked orientation.
Figure 8B:
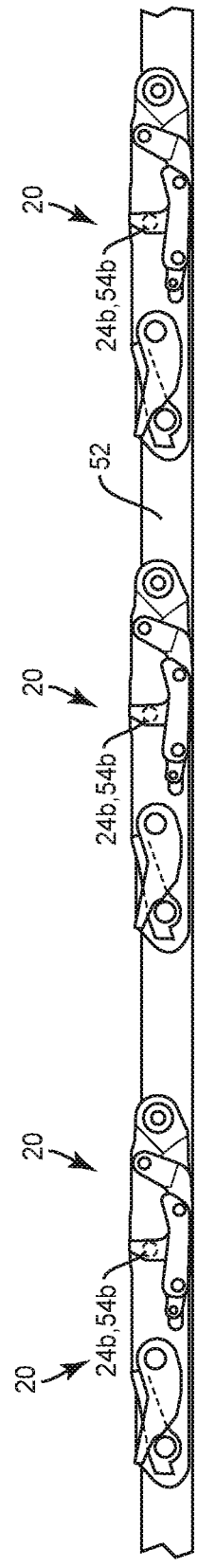
FIG. 8B shows a side view of a rail with the latches in the unlocked orientation.

The openings 54a, 54b may be disposed anywhere along the sidewall of the rail 52 proximate the latch 20 that enables the latch detection system 100 to function as disclosed herein, i.e., such that at least some portion of the latch 20 does not significantly obstruct the light when the latch 20 is in one orientation but at least partially obstructs the light when the latch 20 is in another orientation. For example, the openings 54a, 54b may be disposed near the top of the rail 52 proximate the latch hinge, as shown in FIGS. 8A and 8B. In other aspects, the openings may comprise a slot opening 56 on both sides of the rail 52, each of which align with slot 26 in latch 20. While FIG. 7 only shows a slot 56 on one side of the rail 52, it will be appreciated that a matching slot 56 is on the other side of the rail 52. It will be appreciated that the aspects disclosed herein may use any openings that allow the laser beam to pass unobstructed when the latch 20 is in one orientation (e.g., the locked orientation), but at least partially obstructs the laser beam when the latch 20 is in another orientation (e.g., an unlocked orientation). When necessary, latch 20 may also include openings 24a, 24b (FIG. 6) that align with the rail openings 54a, 54b. Alternatively, the rail openings 54a, 54b, and/or slot opening(s) 56 may align with already existing openings in latch 20, e.g., slot 26.

The axis 130 of the latch detection system 100 is aligned with the rail openings, e.g., with rail openings 54a, 54b as shown in FIG. 7, such that the laser transceiver 110 is on the side of the rail 52 with one of the first and second openings 54a, 54b and the reflector 120 is on the side of the rail 52 with the other one of the first and second openings 54a, 54b. As such, a laser beam 112a emitted by the light emitter 112 passes unobstructed through the openings 54a, 54b when the latch 20 is in the non-obstructing orientation (e.g., the orientation of FIG. 8A).

When there is only one latch/rail disposed between the laser transceiver 110 and the reflector 120, the processor circuit 140 determines that the latch 20 disposed between the laser transceiver 110 and the reflector 120 is in the first orientation (e.g., locked or unlocked) when the laser beam 112a emitted by the light emitter 112 passes through the first and second openings 54a, 54b of the corresponding rail 52, reflects off the reflector 120, and passes back through each of the second and first openings 54b, 54a such that the light detector 114 detects at least the threshold amount of light $L_{th}$. When the light detector 114 detects less than the threshold amount of light $L_{th}$, the processor circuit 140 determines that the latch 20 is in the second orientation (e.g., unlocked or locked).

When there are multiple rails disposed between the laser transceiver 110 and the reflector 120 (e.g., FIG. 7), where the openings 54a, 54b of each rail are aligned along the axis 130, the processor circuit 140 determines that each latch 20 is in the locked orientation when the laser beam 112a emitted by the light emitter 112 passes through the first and second openings 54a, 54b of each rail 52 in the set of rails 50, reflects off the reflector 120, and passes back through each of the second and first openings 54b, 54a such that the light detector 114 detects at least the threshold amount of light $L_{th}$. When the light detector 114 detects less than the threshold amount of light $L_{th}$, the processor circuit 140 determines that at least one of the latches 20 is in the unlocked orientation.

The aspects described herein apply when the latch(es) 20 are disposed in any supporting latch structure, including but not limited to, roller trays/rails, ball mats, etc., where such supporting latch structures either allow a laser beam 112a, 112b to pass by a latch 20 unobstructed when the latch 20 is in a particular orientation (e.g., the locked orientation), or where such supporting structures may be modified (e.g., with openings) to allow the laser beam to pass by a latch 20 unobstructed when the latch 20 is in a particular orientation (e.g., the locked orientation). Thus, the aspects disclosed herein are not limited to the free-standing or rail aspects discussed herein.

While the aspects disclosed herein are directed to a latch detection system 100 including a single laser transceiver 110 and a single reflector 120, it will be appreciated that other aspects of the latch detection system 100 may include multiple laser transceivers 110 and one or more reflectors 120. For example, if rail 52 has a slot 56 coinciding with the slot 26 in the latch, two or more laser transceivers 110 may be positioned along the slot 56 on one side of the rail 50. In this case, either a single reflector 120 spanning the slot 56 or two or more reflectors 120, each spanning some portion of the slot 56, may be positioned along the slot 56 on the other side of the rail 50. This configuration allows the latch detection system 100 to not only determine whether the latch 20 is locked or unlocked, but also to determine how unlocked the latch 20 is. For example, if the laser beam passing through an end of the slot 56 closest to the latch hinge is obstructed, while the laser beams from the other light emitters 112 pass through slot 56 unobstructed, the processor circuit 140 may determine that latch 20 is in the mostly locked orientation, but not in the fully locked orientation. Alternatively, if all laser beams are obstructed except for the laser beam passing through the end of the slot 56 farthest from the latch hinge, the processor circuit 140 determines that the latch 20 is in the mostly unlocked orientation (almost flush with the rail 50), and if all laser beams are obstructed, the processor circuit 140 determines that the latch 20 is in the fully unlocked orientation (flush with the rail 50).

The aspects disclosed herein provide multiple advantages over conventional solutions that secure cargo within a cargo hold 12. Primarily, the aspects disclosed herein help ensure the latches 20 used to secure cargo containers and pallets in a cargo hold 12 are fully locked by the cargo handler. As such, the aspects disclosed herein help create autonomous cargo loading that reduces and/or eliminates the possibility of human error, and thus reduces and/or eliminates the consequences of such human error. For example, because the aspects disclosed herein prevent aircrafts or other vehicles from having latches erroneously left unlocked, the aspects disclosed herein potentially help prevent damage to the vehicle, e.g., aircraft, and/or transport disruptions, e.g., flight disruptions caused by shifting cargo that had not been properly restrained. The aspects disclosed herein also help prevent or reduce anomalies in an aircraft that may result from unexpected cargo shifting within the cargo hold 12. Further, because the aspects disclosed herein do not have any moving parts, and because the aspects disclosed herein are designed specifically to assess the orientation of the latches 20, and are not an adaption of an existing system that already has other uses/purposes, the aspects disclosed herein provide a more reliable and longer lasting alternative to existing latch detection systems, i.e., the micro switch systems.

The aspects disclosed herein may, of course, be carried out in other ways than those specifically set forth herein without departing from essential characteristics disclosed herein. The present aspects are to be considered in all respects as illustrative and not restrictive, and all changes coming within the meaning and equivalency range of the appended claims are intended to be embraced therein.

What is claimed is:

1. A latch detection system configured to determine an orientation of one or more latches configured to secure cargo within a cargo area when in a locked orientation, the latch detection system comprising:
    a laser transceiver disposed on a first side of a first latch, the laser transceiver comprising a light emitter and a light detector;
    a reflector disposed on a second side of the first latch opposite the first side and aligned with the laser transceiver along an axis; and
    a processor circuit configured to determine an orientation of the first latch by:
        determining the first latch is in a first orientation when a laser beam emitted by the light emitter reflects off the reflector such that the light detector detects at least a threshold amount of light; and
        determining the first latch is in a second orientation different from the first orientation when the light detector detects less than the threshold amount of light;
    wherein the first orientation comprises the locked orientation and the second orientation comprises an unlocked orientation;
    wherein one or more additional latches disposed between the laser transceiver and the reflector align with the first latch to form a set of latches comprising the first latch and the one or more additional latches; and wherein the processor circuit is configured to determine the orientation of at least one of the latches in the set of latches by:
  determining that each of the latches in the set of latches is in the locked orientation when the laser beam emitted by the light emitter reflects off the reflector such that the light detector detects at least the threshold amount of light; and
  determining that at least one of the latches in the set of latches is in the unlocked orientation when the light detector detects less than the threshold amount of light.

2. The latch detection system of claim 1 wherein:
the first latch is disposed in a first rail comprising first and second openings on opposing sides of the first rail and proximate the first latch;
the first and second openings in the first rail align with the axis aligning the laser transceiver and the reflector; and
the processor circuit determines the orientation of the first latch by:
  determining that the first latch is in the locked orientation when the laser beam emitted by the light emitter passes through the first and second openings, reflects off the reflector, and passes back through the second and first openings such that the light detector detects at least the threshold amount of light; and
  determining that the first latch is in the unlocked orientation when the light detector detects less than the threshold amount of light.

3. The latch detection system of claim 1 wherein the cargo area is part of an aircraft.

4. The latch detection system of claim 1 further comprising an output device, wherein the processor circuit is further configured to output a signal to the output device responsive to the determination of the orientation of the first latch to inform an operator of the determined orientation of the first latch.

5. The latch detection system of claim 4 wherein the output device comprises at least one of a speaker and a display configured to respectively provide at least one of audible and visible information regarding the determined orientation of the first latch.

6. The latch detection system of claim 5 wherein at least one of the speaker and the display are configured to output at least one of an audible alarm and a visible alarm when the determined orientation comprises an unlocked orientation.

7. The latch detection system of claim 4 wherein the signal output to the output device further informs the operator of an extend of the determined orientation of the first latch.

8. A method of determining an orientation of one or more latches configured to secure cargo within a cargo area when in a locked orientation, the method comprising:
  aligning a laser transceiver along an axis with a reflector, the laser transceiver comprising a light emitter and a light detector, wherein the laser transceiver is disposed on a first side of a first latch and the reflector is disposed on a second side of the first latch opposite the first side;
  emitting a laser beam from the light emitter; and
  evaluating an amount of light detected by the light detector to determine the orientation of the first latch by:
    determining the first latch is in a first orientation when the laser beam emitted by the light emitter reflects off the reflector such that the light detector detects at least a threshold amount of light; and
    determining the first latch is in a second orientation different from the first orientation when the light detector detects less than the threshold amount of light;
  wherein the first orientation comprises the locked orientation and the second orientation comprises an unlocked orientation;
  wherein one or more additional latches disposed between the laser transceiver and the reflector align with the first latch to form a set of latches comprising the first latch and the one or more additional latches; and
  wherein determining the orientation comprises determining the orientation of at least one of the latches in the set of latches by:
    determining that each of the latches in the set of latches is in the locked orientation when the laser beam emitted by the light emitter reflects off the reflector such that the light detector detects at least the threshold amount of light; and
  determining that at least one of the latches in the set of latches is in the unlocked orientation when the light detector detects less than the threshold amount of light.

9. The method of claim 8 wherein:
the first latch is disposed in a first rail comprising first and second openings on opposing sides of the first rail and proximate the first latch;
the first and second openings in the first rail align with the axis aligning the laser transceiver and the reflector; and
determining the orientation comprises determining the orientation of the first latch by:
  determining that the first latch is in the locked orientation when the laser beam emitted by the light emitter passes through the first and second openings, reflects off the reflector, and passes back through the second and first openings such that the light detector detects at least the threshold amount of light; and
  determining that the first latch is in the unlocked orientation when the light detector detects less than the threshold amount of light.

10. The method of claim 8 further comprising outputting a signal to an output device responsive to the evaluation to inform an operator of the determined orientation of the first latch.

11. The method of claim 10 wherein outputting the signal comprises outputting at least one of an audible indication and a visible indication configured to respectively provide at least one of audible information and visible information regarding the determined orientation of the first latch.

12. The method of claim 11 wherein outputting at least one of the audible indication and the visible indication comprises outputting at least one of an audible alarm and a visible alarm when the determined orientation comprises an unlocked orientation.

13. An aircraft comprising:
  a cargo area;
  a first latch disposed in the cargo area and configured to secure cargo within the cargo area when in a locked orientation;
  a laser transceiver disposed on a first side of the first latch, the laser transceiver comprising a light emitter and a light detector;
  a reflector disposed on a second side of the first latch opposite the first side and aligned with the laser transceiver along an axis; and
  a processor circuit configured to determine an orientation of the first latch by:

determining the first latch is in a first orientation when a laser beam emitted by the light emitter reflects off the reflector such that the light detector detects at least a threshold amount of light; and determining the first latch is in a second orientation different from the first orientation when the light detector detects less than the threshold amount of light;

wherein the first orientation comprises the locked orientation and the second orientation comprises an unlocked orientation;

wherein one or more additional latches disposed between the laser transceiver and the reflector align with the first latch to form a set of latches comprising the first latch and the one or more additional latches; and wherein determining the orientation comprises determining the orientation of at least one of the latches in the set of latches by:

determining that each of the latches in the set of latches is in the locked orientation when the laser beam emitted by the light emitter reflects off the reflector such that the light detector detects at least the threshold amount of light; and determining that at least one of the latches in the set of latches is in the unlocked orientation when the light detector detects less than the threshold amount of light.

14. The aircraft of claim 13 wherein:

the first latch is disposed in a first rail comprising first and second openings on opposing sides of the first rail and proximate the first latch;

the first and second openings in the first rail align with the axis aligning the laser transceiver and the reflector; and the processor circuit is configured to determine the orientation of the first latch by:

determining that the first latch is in the locked orientation when the laser beam emitted by the light emitter passes through the first and second openings, reflects off the reflector, and passes back through the second and first openings such that the light detector detects at least the threshold amount of light; and determining that the first latch is in the unlocked orientation when the light detector detects less than the threshold amount of light.

15. The aircraft of claim 13 wherein the processor circuit is further configured to output a signal to an output device responsive to the determination of the orientation of the first latch to inform an operator of the determined orientation of the first latch.

16. The aircraft of claim 15 wherein the output device comprises at least one of a speaker and a display configured to respectively provide at least one of audible and visible information regarding the determined orientation of the first latch.

17. The method of claim 16 wherein at least one of the speaker and the display are configured to output at least one of an audible alarm and a visible alarm when the determined orientation comprises an unlocked orientation.

18. The aircraft of claim 15 wherein the output device is disposed in the aircraft.

19. The aircraft of claim 15 wherein the output device is co-located with the processor circuit.

20. The aircraft of claim 15 wherein the processor circuit is configured to output the signal to the output device by outputting a wireless signal to a remote output device located remotely from the aircraft.

* * * * *